Sept. 5, 1944.   W. V. VIETTI ET AL   2,357,565
METHOD OF DRILLING WELLS
Original Filed Oct. 5, 1935
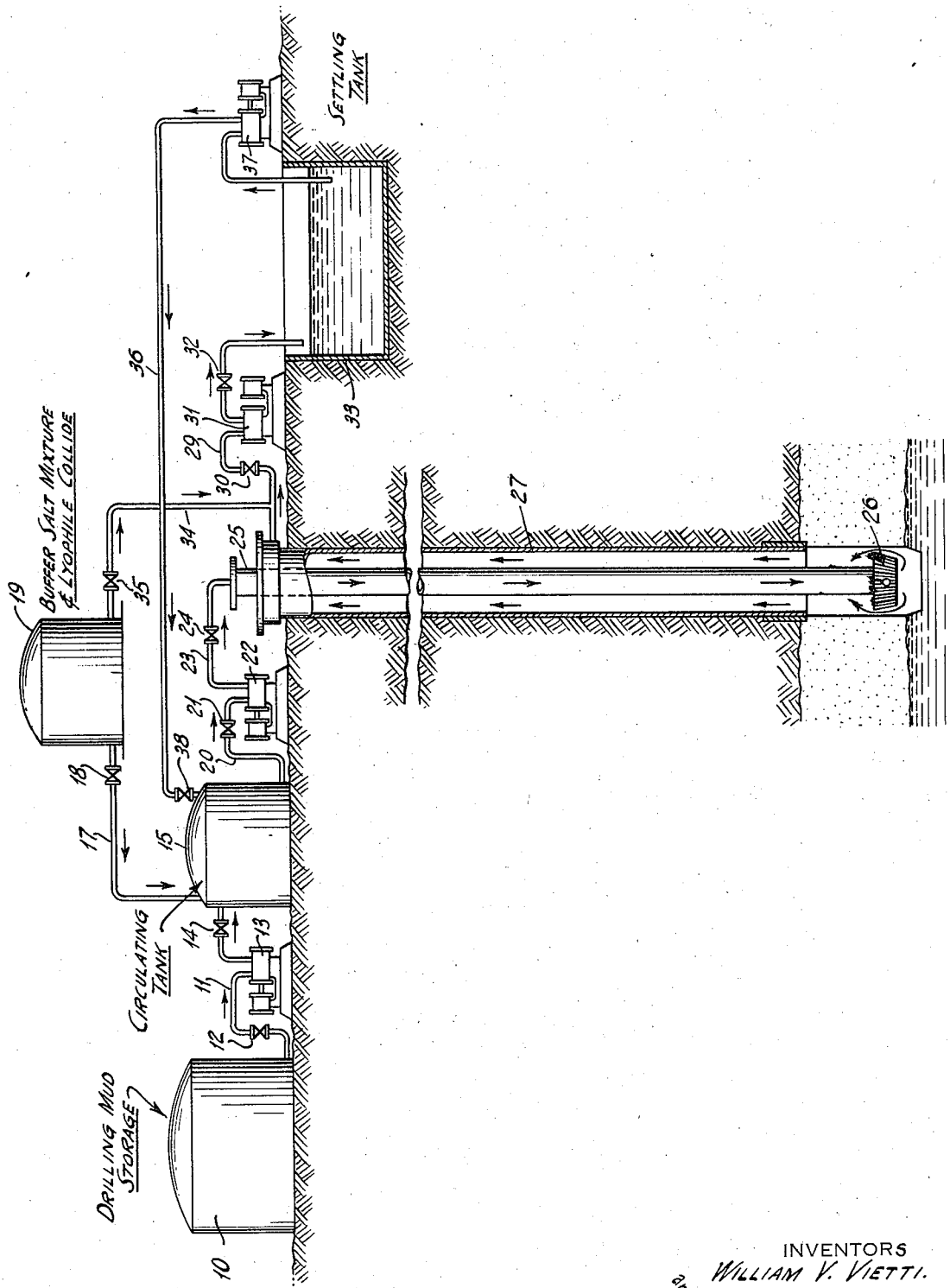
INVENTORS
WILLIAM V. VIETTI.
and ALLEN D. GARRISON.
BY
ATTORNEY Patented Sept. 5, 1944

2,357,565

UNITED STATES PATENT OFFICE

2,357,565

METHOD OF DRILLING WELLS

William V. Vietti and Allen D. Garrison, Houston, Tex., assignors to The Texas Company, New York, N. Y., a corporation of Delaware Original application October 5, 1935, Serial No. 43,774. Divided and this application December 9, 1943, Serial No. 513,560

2 Claims. (Cl. 252—8.5)

This invention relates to drilling muds and more particularly to the conditioning of drilling muds employed in the drilling of wells.

This application is a division of our application Serial No. 43,774, filed October 5, 1935.

More specifically, our invention relates to the control of the viscosity and colloidal properties of drilling muds by the addition thereto of chemical and colloidal compounds, whereby the drilling muds are at all times maintained in a state which permits them to fulfill their functions most successfully.

Drilling muds are almost universally used in the drilling of wells employed for tapping underground collections of oil, gases, brines, and water. These muds fulfill various functions, the most important of which are to assist in the removal of cuttings from the wells, to seal off formations of gas, oil, and water which may be encountered at various levels, and to lubricate the drilling tools and the drill pipes which carry the tools.

Drilling muds are essentially mixtures of clay and water, usually so compounded that they weigh from about eight and one-half to fourteen pounds per gallon. Whenever it is found necessary to increase the specific gravity of a particular mud, it is customary to add thereto finely-divided materials which have a high specific gravity such as barytes, etc.

An ideal colloidal drilling mud is one which is thixotropic, that is to say, a fluid which, on agitation by pumping or otherwise, has a relatively low viscosity and is free-flowing but, when agitation is stopped, gradually sets or gels. This gelling action should be sufficiently slow to permit the cuttings to settle two or three feet before the gel structure is strong enough to support them. When such a drilling mud is circulated through a well, it picks up the cuttings and carries them to the surface and there, upon settling in a settling pit, the cuttings settle out, leaving a substantially cuttings-free drilling mud.

The use of a drilling mud, which is highly thixotropic, is attended by many disadvantages, the more important of which will be discussed briefly. A highly thixotropic mud is one which gels so rapidly that its viscosity reaches high values quickly, usually in from one to three seconds after agitation has stopped. Such a drilling mud is difficult to pump and, although it does effect the complete removal of cuttings from the well, it does not allow the proper separation of cuttings from the mud in the settling ditches and pits where the mud is in a semi-quiescent state. Furthermore, it will be observed that it clings to the drill pipe and the drilling tools and thus exerts an appreciable braking action. In addition to these undesirable properties, it has been observed that the use of a highly thixotropic drilling mud may cause gas blowouts where the well traverses strata containing gases under high pressure. When drilling through such strata, the hydrostatic head of the drilling mud serves normally to more than counter-balance the gas pressure. During the drilling operations, when it becomes necessary to withdraw the drill pipe and the drilling tools, the highly thixotropic drilling mud will cling thereto. In this manner the balance that has existed between the hydrostatic head of the drilling mud and the gas pressure is disturbed and, if the gas pressure is higher than the lessened hydrostatic head of the drilling mud, a gas blowout occurs.

The use of a drilling mud, which is not thixotropic, is attended by some disadvantages, the more important of which will be discussed briefly. A non-thixotropic drilling mud is one which does not set or gel when agitation is stopped. The viscosity of the non-thixotropic mud is low, and, therefore, removes cuttings from the well, in which it is employed, less efficiently than a mud which has a high viscosity. Furthermore, a non-thixotropic mud will not suspend cuttings in the hole, and a temporary cessation of drilling may allow sufficient time for the cuttings to settle back through the mud, and thus pack around the bit and drill pipe, making it impossible to pull the drill pipe when operations are resumed. The use of a non-thixotropic drilling mud also increases the possibility of losing the drilling mud in the well by loss of fluid into porous formations.

The use of a non-thixotropic drilling mud has some advantages which may be utilized in drilling wells through indurated or partially indurated formations, as occur in certain areas. The more important of these advantages will be discussed briefly. A non-thixotropic drilling mud is easy to pump and can effect the pumping and complete removal of cuttings in a well in which it is employed, provided the fluid velocities are maintained at sufficiently high values. A non-thixotropic mud will not cling to the drilling pipe, and will not cause an unbalancing of the hydrostatic head exerted by the drilling mud in the well. A non-thixotropic drilling mud will allow the cuttings to drop out into the ditch and in the pits to a much higher extent than occurs in the highly thixotropic muds. Gas entrained in the mud, while passing through the gas-bearing strata, is quickly released, thus allowing the mud to regain its weight in the ditch and pit before being pumped back into the well.

Drilling muds may then be classified as non-thixotropic, thixotropic, or highly thixotropic, all of which consist essentially of colloidal dispersions, or semi-colloidal suspensions of clay in water. The desirable mud to use is a mud which is thixotropic and possesses none of the undesirable characteristics of the very slightly or very highly thixotropic drilling muds.

Drilling muds consist essentially of colloidal dispersions of clay and water. When this is considered, in conjunction with the further fact that the thixotropic character of a drilling mud is a function of its colloidal condition, it becomes obvious that the clay particles, having a size within the colloidal particle size range, determine largely the thixotropic character of a drilling mud. The aforementioned colloidal particles of clay are essentially acids whose anion is a micell of the general formula

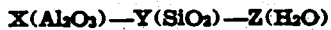

$$X(Al_2O_3)-Y(SiO_2)-Z(H_2O)$$

where X is approximately 1, Y is approximately 3, and Z may vary over wide values.

In the interests of simplicity, the aforementioned anion will be termed hereinafter as clay and the compounds formed by its combination with various cations will be termed clays of such cations; so, for example, the hydrogen compound will be termed hydrogen clay or acid clay, the sodium compound will be termed sodium clay, while the calcium compound will be called calcium clay. For purposes of this discussion, we consider several types of clays, acid or hydrogen clays; polyvalent ion clays such as calcium or magnesium clays; monovalent ion clays as exemplified by potassium clays and, finally, a separate grouping of monovalent ion clays limited to lithium and sodium clays. We have discovered that the last mentioned class differs in its properties from the broader class of monovalent ion clays and, because of this, we have classified it separately.

We will now examine, briefly, the characteristics of drilling muds in which these various types of clays predominate. An acid clay, upon dispersion in water, yields a highly thixotropic drilling mud which is sensitive to flocculation and which gels with great rapidity. Because of these properties, it is not desirable normally for use as a drilling mud. Similarly, drilling muds formed by the dispersion in water of polyvalent ion clays or of monovalent ion clays other than lithium and sodium are sensitive to flocculation and possess characteristics of high gel rate and high gel strength which render them undesirable for common use as drilling muds. We have discovered, however, that drilling muds formed by the dispersion of lithium or sodium clays in water are dispersions of the proper degree of thixotropy which are particularly valuable when they are maintained within a pH range of from 8.5 to 11.0. We, therefore, propose the use of drilling muds consisting essentially of dispersions of sodium clays or lithium clays or mixtures of these in water, said dispersions being maintained at a hydrogen ion concentration of from 8.5 to 11.0.

When a sodium or lithium clay drilling mud is employed, it has been found that through base exchange with hydrogen or polyvalent ion clay strata, the sodium or lithium clays may be converted into either hydrogen or polyvalent ion clays. Such a reaction is highly undesirable since the final drilling mud is highly thixotropic and is not useful for the usual drilling purposes. The rate of, and amount of the base exchange is dependent on the exchangeable amount of hydrogen and/or polyvalent ions present in the natural zeolites being drilled, on the concentration of sodium or lithium ions in the aqueous phase of the drilling mud being used, on the pH of the drilling mud being used, and perhaps on certain other factors unknown to us.

This type of conversion could produce drilling muds which could be used were the conversion complete. A complete conversion would result in an acid clay mud, or in a polyvalent clay mud. These muds would be sensitive to flocculation, and although usable would not be desirable, because of their inherent sensitiveness in use, particularly if it might be desirable to add treating chemicals, or if these muds were used in drilling porous strata containing alkaline waters.

Various means have been suggested for maintaining a drilling mud in a thixotropic state. If high hydrogen ion concentrations are to be combatted, alkali materials such as sodium hydroxide are incorporated in the drilling mud. This is an undesirable method of solving the problem because, if sufficient alkali is employed, the pH of the drilling mud will be considerably higher than the upper pH range of a thixotropic drilling mud.

By our invention, we are enabled to avoid the disadvantages inherent in the aforementioned processes in that we render a thixotropic drilling mud highly resistant to both acidification and to base exchange. We accomplish this result by providing as the aqueous phase of the drilling mud a buffer salt solution containing disodium phosphate. By using such a solution as the aqueous phase of the drilling mud, the pH of the drilling mud may be maintained within the range of from 8.5 to 11.0. We do not, however, intend to limit ourselves to buffer salt solutions containing only disodium phosphate, but contemplate the use of various mixtures comprising disodium phosphate and including such compounds as sodium or lithium hydroxides and water-soluble salts such as sodium and lithium salts of boric, phosphoric, carbonic, oxalic, silicic, and similar weak acids.

Not only does the disodium phosphate maintain the hydrogen ion concentration relatively constant within the stable range for the particular clay dispersions in use, but it also retards the rate of base exchange. However, since this salt is an electrolyte, it has a tendency to cause the drilling mud to become coagulated. In order to avoid this, we have found it desirable to incorporate in the drilling mud small quantities of lyophile colloids such as quebracho, straw emulsion, dextrine, starch, gallo-tannic acid, catechu, casein, and equivalent materials.

We have discovered a particular mode of employing drilling muds treated in accordance with the aforesaid method which permits of the most effective drilling of wells. Wells are usually drilled by means of a rotating drill point or tool, the rotary movement being imparted to it from the surface through a hollow pipe or conduit. This pipe or conduit is situated within a casing or pipe, the diameter of which is slightly larger than that of the drilling tool. In the course of the drilling operation, a drilling fluid or mud is delivered into the drill pipe or conduit, through which it passes, until it reaches the drilling tool. Drilling tools are usually provided with openings through which the drilling fluid passes and, on its emergence therefrom, come into contact with the strata being penetrated. It serves two primary purposes, the one to lubricate the drilling tool and the other to remove the cuttings or debris which have been cut out of the strata by the drilling tool. The latter is effected by the drilling fluid rising upwardly through the casing in the space between the inner wall of the casing and the drill pipe and being discharged at the surface level.

When an ordinary drilling mud, consisting essentially of water and clay, is employed in the aforesaid manner, it will be observed in many cases that although the mud, when first introduced into the drilling pipe, was a colloidal fluid of the proper degree of thixotropy, upon emergence from the casing, it will have lost its desirable characteristics, usually being more or less gelled and, therefore, unsuitable for further use. However, by adding disodium phosphate or a mixture comprising disodium phosphate to the drilling mud, the gelling of the drilling mud can be largely minimized. Such a drilling mud, after its circulation to the locus of drilling, will be found, upon its emergence from the casing, to have depreciated only slightly, if at all, in quality. By incorporating one of the previously-mentioned lyophile colloids in the buffered drilling mud, it is possible to minimize or neutralize the temporary flocculation which the disodium phosphate may have upon the mud dispersion. The lyophile colloid may either be mixed with the buffer salt solution containing disodium phosphate or may be added to the drilling mud before or after the addition to it of the solution.

We have found that in many cases, it may be unnecessary to further treat the cuttings-laden drilling mud before delivering it to the settling pit where the cuttings are allowed to settle out. However, in some cases, it may be desirable to mix a further quantity of the buffer salt solution containing disodium phosphate which may or may not contain a lyophile colloid with the drilling mud prior to its discharge into the settling pits. By following this method of application, it is possible to maintain a drilling mud constantly in a condition in which it fulfills its function most successfully.

Our invention may be described further in connection with the drawing which sets forth in diagrammatic form a preferred scheme of drilling mud treatment.

The numeral 10 designates a storage tank for fresh mud consisting essentially of clay and water. This storage tank is connected through the line 11, valve 12, pump 13, valve 14, with the circulating tank 15, which serves as a reservoir for the drilling mud circulation system. This tank, which may be provided with a suitable agitating device, is connected by means of the line 17, controlled by the valve 18, with a tank 19, containing a concentrated solution of a buffer salt solution containing disodium phosphate and a suitable lyophile colloid. The tank 15 is connected by the line 20, controlled by the valve 21, with the pump 22, which discharges through the line 23, controlled by valve 24, into the drill pipe 25. This drill pipe, which is of conventional construction, extends into the earth and is fitted at its lowermost point with a drilling or cutting tool 26. The casing 27 is concentrically fitted around the drill pipe 25 and extends from the surface a varying distance into the hole which is being drilled. The space between the drill pipe and the casing communicates through the line 29, with the settling pit 33, through the valve 30, the pump 31, and the valve 32. A line 34, controlled by valve 35, connects the storage tank 19 with the line 29 at a point intermediate the outlet of the casing 27 and the pump 31. The settling pit 33 is connected through the line 36, pump 37, and the valve 38, with the circulating tank 15.

In a typical application of our invention, in connection with the described apparatus, a suspension of clay and water is prepared in the storage tank 10 by suspending a given weight of clay in the proper quantity of water. A definite quantity of this suspension is delivered into the circulating tank 15 and there is added to it a sufficient quantity of the concentrated solution of the disodium phosphate and lyophile colloid to bring the pH of the mud within the range of from 8.5 to 11.0. After suitable agitation, the alkaline drilling mud is then delivered by a suitable pump 22, into the drill pipe 25, passing downwardly through it and through the drilling tool, which is mounted at its lower end. The mud picks up the cuttings and loosened debris and carries them upwardly in the space between the casing and the drill pipe. At the surface, this mixture is discharged directly into the line 29, which delivers it to the settling pit 33. In those cases where the mud is found to have increased in viscosity, due to chemical changes undergone during its brief contact with the strata being drilled, it is desirable to inject into it a further quantity of the concentrated solution of the disodium phosphate and the lyophile colloid.

Upon remaining relatively quiescent in the settling pit, the cuttings and debris settle out, while the drilling mud remains in a state of stable suspension. There is continuously withdrawn from the settling pit at a strategic point, a sufficient quantity of cuttings-free mud to maintain a sufficient amount of mud in circulation.

We offer herewith several examples of the application of our invention to the treatment and conditioning of drilling muds. In the course of drilling a well in the Manvel field, Brazoria County, Texas, the drilling mud, consisting essentially of a dispersion of clay in water having a weight of 10.4 pounds per gallon, became flocculated. The viscosity of the drilling mud was so high that it was impossible to determine it by means of the Marsh funnel viscosimeter. There was then added to the drilling mud, having a total volume of approximately 6000 cubic feet, a mixture of 100 pounds of disodium phosphate and 44 pounds of quebracho dissolved in 100 gallons of water. After the treatment, the drilling mud was found to be of the proper degree of thixotropy, having a pH value of 9.1, a weight of 10.2 pounds per gallon and a viscosity of 58 seconds through the Marsh viscosimeter.

While drilling another well in the same field in which a like amount of drilling mud was used, the mud became flocculated and, like the drilling mud used in the previously mentioned well, its viscosity was too high for measurement in the Marsh viscosimeter. There was then added to the flocculated drilling mud a solution of 50 pounds of disodium phosphate and 22 pounds of quebracho in 50 gallons of water. In a relatively short time, the viscosity was found to have dropped to 100 seconds. The drilling mud was then treated with an additional 50 pounds of disodium phosphate and 22 pounds of quebracho in 50 gallons of water and this further treatment reduced the viscosity to 40 seconds. Examination of the drilling mud showed it to be of the proper degree of thixotropy and ideally suited for the purpose for which it was intended.

Obviously many modifications and variations of the invention as hereinbefore set forth, may be made without departing from the spirit and scope thereof, and therefore only such limitations should be imposed as are indicated in the appended claims.

We claim:

1. In the art of drilling and controlling wells, the method comprising circulating in the bore hole a mud containing an aqueous dispersion of clayey colloidal matter, and maintaining the mud in a thixotropic state by adding to it in the course of its circulation a buffer salt solution containing disodium phosphate, and a lyophile colloid.

2. In the art of drilling and controlling wells, the method comprising circulating in the bore hole a mud containing an aqueous dispersion of clayey colloidal matter, and maintaining the mud in a thixotropic state by adding to it in the course of its circulation a buffer salt solution containing disodium phosphate, and quebracho extract.

WILLIAM V. VIETTI.
ALLEN D. GARRISON.